Aug. 20, 1968   J. L. GREATOREX   3,398,091
MEMBRANE SEPARATION APPARATUS AND PROCESS
Filed Aug. 9, 1966   2 Sheets-Sheet 1

INVENTOR
JOHN L. GREATOREX
BY, Norman E. Saloba
ATTORNEY

Aug. 20, 1968  J. L. GREATOREX  3,398,091
MEMBRANE SEPARATION APPARATUS AND PROCESS
Filed Aug. 9, 1966  2 Sheets-Sheet 2

INVENTOR
JOHN L. GREATOREX
BY, Norman E. Saliba
ATTORNEY 3,398,091
MEMBRANE SEPARATION APPARATUS
AND PROCESS
John L. Greatorex, Marblehead, Mass., assignor to
Ionics, Incorporated, Watertown, Mass.
Filed Aug. 9, 1966, Ser. No. 571,250
13 Claims. (Cl. 210—23)

ABSTRACT OF THE DISCLOSURE

A stack of plate-like sub-assemblies, each sub-assembly comprising spacer frames defining first and second compartments, and a third compartment common to two sub-assemblies, wherein the first and second compartments are separated by a heating barrier and the second and third compartments are separated by a semi-permeable membrane barrier, wherein the third compartment is under vacuum, and wherein the fluid mixture to be separated traverses a deflected flow path.

---

This invention relates to apparatus and methods for the separation or purification of fluid mixtures by means of the selective transfer of mass through a membrane. More particularly, it relates to a novel manner of internally manifolding within a fluid separation membrane apparatus the various fluid streams which enter and/or leave the chambers of the apparatus so as to prevent, inhibit or reduce leakage of one stream into another. Specifically, it concerns the passing of two or more streams of fluid into the appropriate chamber of a multi-chamber membrane separation apparatus or device in a manner to prevent undesirable leakage of fluid from one chamber into another chamber. For purposes of this disclosure, a fluid is defined as a liquid, vapor, gas or a mixture of the same, and a membrane is defined as a barrier which is differentially permeable to the components of the fluid mixture.

There have been developed numerous processes and systems for the separation and/or purification of fluids by means of the selective transmission of mass through a membrane barrier from one fluid to another. Cells for carrying out membrane separation processes are frequently of the stack type having a series of thin compartments or chambers between a pair of terminal end plates. The spacers forming the compartments or chambers may have the shape of open frames and are generally separated from each other by membranes or other stack elements. In any membrane separation aparatus, such as that which might be employed for mass diffusion, gaseous diffusion (molecular effusion), electrodialysis, piezodialysis, thermodialysis, thermoösmosis, electroösmosis, dialysis, osmosis, ultrafiltration (hyperfiltration), reverse osmosis (piezoosmosis), membrane permeation (pervaporation), and the like, the introduction of fluids into and out of each compartment is difficult since the distance between adjacent barriers is preferably small, and the compartments and spacers very thin. The fluid streams entering the apparatus must be made to flow in generally parallel planes within the spacer compartments, the fluids in adjacent compartments being generally separated from each other by a membrane, film and/or other type of thin barrier. A component of one fluid will for example pass through a membrane into an adjacent compartment. Generally, the introduction and removal of fluid is by means of one or more conduits or manifolds internally formed within the stack by the alignment or registration of holes or apertures in the gasketing areas of the membranes, spacers and/or other elements forming the stack. Appropriate fluid inlet and/or outlet manifold holes in each spacer may be connected as desired to the fluid flow path area of the compartment in that spacer by a connecting channel, or other means, for example, by removing a section of the spacer frame material. These entrance and/or exit channels may, for example, form narrow passageways connecting the manifold in the spacer with the fluid-holding compartment area. The manifold holes or apertures may be located in an appropriate marginal gasketing area or in a more centrally located gasketing area. The various fluids which may be circulated through the appropriate compartments are hydraulically separated from each other, each fluid being directed to and/or removed from the appropriate compartments by an independent set of inlet and outlet manifold holes.

Ideally, the membranes or other barriers employed in a separation stack are thin and therefore they are also relatively flexible so that under the application of small differential pressures, bowing deformation or deflection will occur. The barrier area which is highly susceptible to such deformation is adjacent to and encompassed within the connecting entrance and/or exit channel area of the spacer. This critical barrier area will tend to deform into the connecting channel under the pressure applied to gasket the membranes, spacers and other elements of the stack into a fluid-tight arrangement. Such deformation will also occur into a channel when the fluid stream in the compartment, which is on the same side of the membrane as the channel, is circulated under a lower pressure than that on the opposite side. The result is that some of the liquid from one conduit stream will pass behind the barrier area which has deformed into the connecting channel of another conduit stream, and thus enter the lower pressured manifold as unwanted foreign material. Deformation is especially serious in membrane processes in which a substantial differential pressure (5 or more p.s.i.) exists between the surfaces of a barrier. For example, leakage of fluid may generally occur from a higher pressured compartment via the bowed membrane area into an adjacent lower pressured product compartment. Past attempts to overcome the difficult problem of deformation and resulting cross-leak have included fitting a porous insert or bridge within the connecting entrance or exit channel of the spacer to give support to the critical overlying area of the adjacent membrane. Such methods are fully described in U.S. Patents Nos. 2,881,124, 2,-894,894, and others. In practice, these mechanical supports are troublesome and expensive to insert, may slip during stack assembly, and during operation may restrict liquid flow through the connecting channel to cause excessive hydraulic pressure drops.

Therefore, it is an object of this invention to provide a novel membrane stack separation apparatus having a flow arrangement for fluid streams wherein the manifold holes and connecting channels in the gasketing area of the spacer are placed and arranged to divert at least one of the fluid streams in such a fashion as to inhibit, reduce or eliminate cross-leakage of such fluid stream into another.

A further object is directed to systems for introducing and/or removing separate fluid streams to and from separate and closely spaced compartments in a separation stack in a predetermined manner so as to keep each stream substantially separate and, in turn, reduce cross-leakage.

A further object is to reduce membrane deformation.

A further object is to prevent undesired leakage of fluid from one compartment of a membrane separation apparatus into another compartment.

Various other objects and advantages will be particularly pointed out hereinafter in connection with the appended claims.

For a fuller understanding of the invention, reference should be made to the following detailed disclosures taken in conjunction with the drawings. To better understand the invention, the description and drawings are made with specific reference to a membrane permeation apparatus and process; however, it is not to be construed as limited thereto except as defined in the claims and is particularly useful also in mass diffusion, gaseous diffusion (molecular effusion), dialysis, electrodialysis, piezodialysis, thermodialysis, osmosis, electroösmosis, piezoösmosis (reversed osmosis), thermoösmosis, ultrafiltration (hyperfiltration), electrodecantation, and other barrier separation processes. Like numerals are used in the drawings to designate like parts.

Briefly speaking, membrane permeation or distillation is a single-effect distillation process employing a thin non-porous plastic film or membrane between the liquid phase and vapor phase. The composition of a liquid mixture may be changed by allowing a portion of the mixture to pass or permeate through an appropriate membrane which is more selective to the passage of one or more components of the mixture relative to the remaining component. The liquid feed mixture is contacted with one face of the membrane, and the components permeating the membrane are removed in the vapor phase from the other face of the membrane. The driving force for th separation is usually the concentration gradient established within the membrane by vaporizing liquid from the "downstream" or "vapor" face of the membrane, most conveniently by establishing a vacuum pressure on the "downstream" side. The composition of the permeate vapor recovered at a given temperature and vapor pressure is not only determined by the composition of the feed mixture, but also by the nature of the membrane. For example, a membrane which is strongly hydrophilic will preferentially allow the selective permeation of water in a mixture thereof but will impede the evaporation of organic constituents. Thus, water can be removed, for example, from a coffee extract or from fruit juices without removal of any significant fraction of the volatile flavor or aroma constituents which would be lost during a conventional process.

Figure 1:
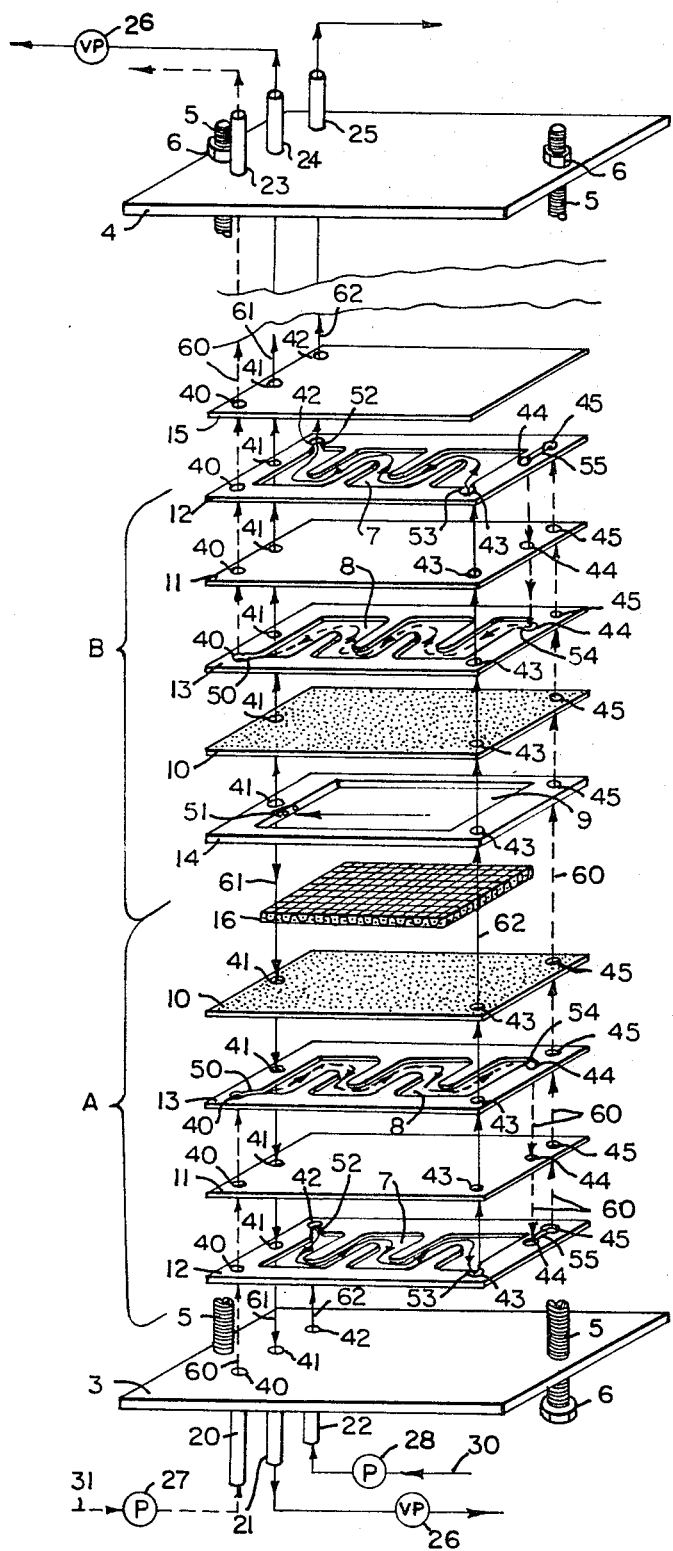
FIG. 1 is a perspective view of an improved membrane separator apparatus, the specific embodiment being that of a membrane permeation apparatus showing the arrangement of the structural elements in exploded relationship with one another. In the embodiment shown, a separator plate is employed between each repeating unit pair of the apparatus.

The permeation cell as illustrated in particular in FIG. 1 is basically of a package design and is comprised of a stack of numerous thin flat elements arranged similarly to a plate-and-frame filter type press. The cell comprises two basic units A and B placed between a pair of terminal end plates 3 and 4. It is to be understood that a single basic unit can be employed or any number of units arranged in a repeated fashion between the end plates. Preferably, the units are arranged in pairs between the end plates. A fluid-tight stack is obtained by applying the proper pressure against each end plate as by bolts 5 and nuts 6.

In the apparatus illustrated, each basic unit comprises three individual compartments 7, 8, 9, separated from each other by barriers of either a semi-permeable membrane 10 or a sheet of heat transfer material 11 which is substantially impermeable to mass transfer. The heating compartment or chamber 7 and fluid feed compartment or chamber 8 are comprised from spacer members 12 and 13, respectively, and are separated from each other by a suitable heat transfer surface or heat exchanger sheet 11 made, for example, of a thin sheet of suitable metal, graphite or impervious plastic film. The required latent heat of evaporation is supplied to the liquid in the feed compartment 8 via the heat transfer sheet 11 by circulating hot water or steam or other heat transfer fluid through the heating compartment 7.

The vapor chamber 9 formed from spacer frame member 14 is separated from the adjacent feed compartments 8 by a thin semi-permeable membrane 10. Spacer frame member 14 is conveniently formed of a relatively rigid, chemically inert material such as plastic or stainless steel. Associated with each membrane 10 are gasketing frame means (not shown) to allow the membrane 10 and adjacent spacer member 14 to gasket with respect to one another. Associated with the spacer member 14 is a membrane support member 16 made of a non-corroding fluid-permeable material such as porous metal, ceramic or plastic which is preferably held in the frame of spacer 14 and made to fit into the vapor compartment 9 on assembly of the stack. The support member 16 which can, for example, have a surface of a tight fine mesh screen of stainless steel, is placed adjacent to and in direct face-to-face contact with the adjacent thin membranes to prevent the membranes from rupturing and bursting into the vapor compartment due to any difference of pressure which may exist between the feed and vapor compartments.

Ideally, the vapor compartment 9 is completely sealed off from the adjacent feed compartments 8 to insure that any fluid entering the vapor compartment will occur only by passage or permeation (pervaporation) through the separating membrane barrier 10. However, as mentioned heretofore, such a condition does not exist in the prior art practice of membrane separation techniques due to membrane bowing and the resulting cross leakage of fluid from one compartment to another. Spacer members 12 and 13 are usually made of a plastic gasketing material such as polytetra-fluoroethylene, polypropylene, butyl rubber, silicone rubber, ethylene-propylene-terpolymer rubber and the like, and have open central portions which preferably define a tortuous fluid-flow path area for the heating compartments 7 and feed compartments 8. These compartments are confined by the frame or border of the spacer members, with said frame also functioning as a gasket with respect to the elements of the stack adjacent thereto. The flow path of each spacer may also incorporate straps and other mechanical means (not shown) for promoting turbulent flow of fluids along the flow path area. U.S. Patents Nos. 2,708,658 and 2,891,899 fully disclose spacer designs which are applicable for use in certain membrane separation devices.

The membranes 10 employed for liquid-vapor phase permeation are well known in the art and may include solid, non-porous, semi-permeable organic barriers such as plastic films or sheets. Of those which are water permeable may be mentioned membranes of cellulose esters, such as cellulose acetate and butyrate, polyvinyl alcohol, partially hydrolyzed polyvinyl acetate, partially hydrolyzed polyacrylonitrile, methyl or ethyl cellulose and the like. Ion-exchange membranes also are well suited for selective water removal. The manufacture and properties of ion-exchange membranes are fully disclosed in the prior art by U.S. Patents Nos. 2,702,272, 2,730,768, 2,731,408, 2,800,445, Re. 24,865, and others. The membranes should be as thin as possible under the conditions of use, for example, 0.0001 to 0.010 inch and, of course, must be essentially non-porous, that is, free from macropores, pin holes or tears, etc., which would destroy the continuity of the membrane surface and allow bulk transport of fluid therethrough.

Each terminal plate 3 and 4 may be provided with one or more ports 40, 41 and 42 extending through the plates and inlet and/or outlet means 20, 21, 22, 23, 24, 25, to which couplings can be made to carry fluid to and/or from the various compartments of the stack by way of appropriate holes and channels which are provided in the various members of the stack. Vacuum pumps 26, condensers or other means may be provided at tubes 21 and 24 to produce by evacuation the desired low pressure or partial vacuum within the vapor compartment 9 or, alternatively, a sweep gas may be pumped through the vapor compartments. Pumping means 27 and 28 are provided at inlets 20 and 22 for the passage of fluids respectively into feed compartments 8 and heating compartments 7 and for the withdrawal of fluids from said compartments at outlets 23 and 25.

The numerous elements of the stack are provided in their gasketing areas with holes or apertures which may be in the margins of such elements and/or in internal gasketing areas reserved for such purposes. Certain of said holes in each spacer member are provided with connecting channels or slits which communicate with the open interior of the spacer to allow a predetermined fluid stream to enter and/or leave the appropriate compartments, while other holes are provided for the by-passing of other fluid streams to other compartments. The particular arrangement of the numerous holes or apertures and connecting channels is determined by the location of the inlet and outlet means on the end pressure plates and also on the particular direction or order of fluid flow desired through the stack.

The drawings illustrate series flow of both the heat transfer stream 30 and feed stream 31, both streams being separate and running concurrently with each other. Of course, the streams may also be operated counter-currently to each other if desired. The passage of fluid streams to the appropriate compartments and their withdrawal therefrom is managed by an internal manifold or conduit systems 60, 61 and 62 which run through the stack in the general direction designated by the arrow. The conduits are formed by the alignment or registration of the plurality of the holes or apertures located in the gasket areas of the individual stack elements.

The elements of the stack are normally provided with at least one vacuum manifold hole 41 in addition to two or more fluid manifold holes. The membrane barriers 10 and the vapor spacer 14 are each provided in one portion of their gasket area with a pair of manifold holes 43 and 45 and in another portion with a single vacuum manifold hole 41, the vacuum hole situated to overlie outlet means 21 and 24 on the end plates. The other elements of the stack also contain vacuum holes 41 similarly situated so that on assembly of the stack a vacuum conduit 61 is formed internally through the cell by alignment of vacuum manifold holes 41. The vapor compartment 9 formed by spacer 14 is connected to its respective vacuum manifold hole 41 by means of passageways or connecting channels 51. In operation, the fluid component permeating the membrane will vaporize into the vapor compartment and be removed therefrom through connecting channels 51 and finally withdrawn from the apparatus through outlets 21 and 24 via vacuum conduit 61.

Each spacer defining a heating compartment 7 is provided with inlet and outlet manifold apertures 42 and 43 which are connected with the fluid flow path area of the compartment by connecting passageways 52 and 53. Entry to and exit from the feed compartment 8 are similarly provided by inlet and outlet manifold apertures 40 and 44 with the accompanying connecting channels 50 and 54. For purposes of illustration, a single inlet aperture is shown on the opposite side of the spacer from a single outlet aperture in each of said compartments. The heating compartment spacers 12 and heat transfer plates or sheets 11 are also provided with manifold apertures 40 and 44 which are aligned with similarly situated influent and effluent apertures 40 and 44 of feed compartment spacer 13. The adjacently located holes 44 and 45 in heating spacer 12 are connected to each other by deflecting path 55. This allows receiving in one direction the effluent stream 60 from the adjacent feed compartment 8 and deflecting and completely reversing the direction of said stream so that it will flow back towards the spacer from which it came by passage through apertures 45 of the various stack elements, that is, the heating spacers 12 have means for receiving a feed stream coming from one direction and deflecting said stream to cause it to flow in a second composite direction generally opposite to that of said first direction. It will be noted that the membranes (and also the vapor spacer) in no case have manifold holes which are aligned with the influent and effluent manifold holes of the adjacent feed spacers. By such an arrangement, the membrane area overlying the connecting channel areas 50 and 54 of the feed spacer will have a reduced tendency to bow into these connecting channels, and any bowing that might occur would in no event be harmful. Because of the absence of a membrane manifold aperture in the area adjacent to the connecting channels 50 and 54 and accompanying apertures 40 and 44, there is no possible way for the feed solution located in conduit 60 to flow under the bowed area of the membrane into the vapor compartment. Although not illustrated, it will be obvious that similar flow deflecting means could be incorporated in the spacers 14 to inhibit deformation of barriers 11 if they were subject to such deformation.

It is preferable that two or more separate individual subassemblies such as A and B be utilized in pairs between the end plates so that a vapor compartment 9 defined on both sides by membranes 10 will be common to each subassembly of the pair. The vapor compartment 9 will thus serve to receive permeate from the two adjacent feed compartments 8 as shown in the drawing. It is to be understood that additional subassemblies or pairs of subassemblies may be placed in a repeating arrangement between heating compartment separator plate 15 and end plate 14 in the area where the drawing is broken. The separator plate 15 which is conveniently made of a sheet of impervious relatively rigid material will function to separate the heating compartment 7 of subassembly B from the heating compartment of the next adjacent repeating subassembly or pair of subassemblies.

The operation of the apparatus and the improved manner of directing the fluid streams through the stack may be more fully described by referring in particular to FIG. 1. By the present invention, it is generally desired to distribute a fluid-feed mixture to each of a set of feed compartments in a multi-unit stack by flowing said mixture in series from one feed compartment to another feed compartment and so on. Another fluid stream of, for example, hot water is simultaneously passed in a like manner into a set of adjacent compartments, such as heating compartments. A third stream, for example, a partial vacuum or, in the alternative, a sweep gas may be passed through each of a third set of compartments, for example, vapor compartments, with all streams being normally kept separate from one another. There may under some circumstances be a fourth and even a fifth stream. By the present invention, a feed stream 31 of a liquid mixture, for example, an aqueous coffee extract having 25% solids, is passed by a pump 27 into inlet 20 at a rate of about one gallon per hour and flows through conduit 60 as shown by the direction of the broken line arrows. The stack employed is comprised of six repeating unit pairs with a total utilized membrane permeation area of about 40 ft.² On entering inlet manifold aperture 40 of feed compartment 8 of subassembly A, the solution mixture is caused to flow in a tortuous path across the compartment to outlet manifold aperture 44. Since the adjacent membrane 10 of, for example, cellulose nitrate, does not have an aperture which aligns with outlet manifold aperture 44, the solution leaving the feed compartment is forced to flow back to aperture 44 of the adjacent compartment 7 of subassembly A. The solution must then pass into adjacent aperture 45 by way of passageway 55 which extends between apertures 44 and 45, then completely reverse its direction to pass via apertures 45 to a second compartment 7 located in subassembly B. The stream is once again deflected by making a complete about-turn and now flows through apertures 44; until it reaches compartment 8 of subassembly B. Since adjacent membrane 10 also does not have an aperture aligned with aperture 44 of spacer 12, the stream will necessarily enter feed compartment 8, and pass out therefrom at aperture 40. The stream will then continue on to become the feed stream for the next repeating unit and, eventually, after passing through all the remaining feed compartments of the stack, be removed from the stack at outlet 23 and collected as the product. The product is found to be concentrated to 50% solids and collected at a rate of about 0.5 gallon per hour. The feed mixture solution can first be heated before entering the stack, preferably to a temperature of about 130° F., and its temperature maintained during passage through the stack by absorption of heat from an adjacent heating compartment 7. Heat transfer fluid, for example, water, at a temperature of about 140° F. is continuously fed into inlet 22 by a pump 28 at about two gallons per minute and allowed to flow through conduit system 62. In the passage of such fluid through the heating compartments 7, the heat contained therein will be transferred to the feed mixture contained in feed compartments 8 by means of the heat transfer sheet 11, (which are, for example, of anodized aluminum), which separate the compartments from each other.

The pressure in the vapor compartment 9 is generally maintained at a lower pressure than that in the feed compartment. Such lower pressure is preferably obtained by producing, for example, a partial vacuum in the compartment by evacuation at outlets 21 and 24 by a vacuum pump 26 or other suitable device. Water from the feed mixture solution (for example, coffee extract) contained in feed compartment 8 will preferentially permeate the water permeable membrane 10 (preferably of the hydrophilic type) and emerge from the lower pressure side of the membrane as a vapor. It is essential that the water vapor emerging at the vapor side of the membrane be removed quickly and thus reduced pressure is required in the vapor compartment to efficiently remove the vapor phase therein. This vapor will pass through the porous support material 16 and be removed from the vapor compartment via connecting channel 51. The vapor is withdrawn from the stack at outlet 21 and/or 24 and condensed and collected at a rate of about five pounds per hour.

For the processing and concentration of an aqueous coffee extract, the membrane employed preferably should be hydrophilic; that is, having a composition in which water is soluble. The permeation or separation of water proceeds efficiently if the feed compartments are completely filled with the coffee extract so that liquid alone comes in contact with one side of the membrane at all times. Where there is a vapor contact on the extract side of the membrane surface, the rate of permeation drops radically. Reasonably good liquid surface contact is assured by reasonably high flow rates and turbulent mixing of the coffee solution through the feed compartment. The heat required for the vaporization of water is provided from the heat content of the heat transfer fluid which of course drops in temperature as it passes through the heating compartments. On passage out of the stack, the heat transfer fluid may be reheated to the desired temperature and recirculated back to the stack.

Figure 2:
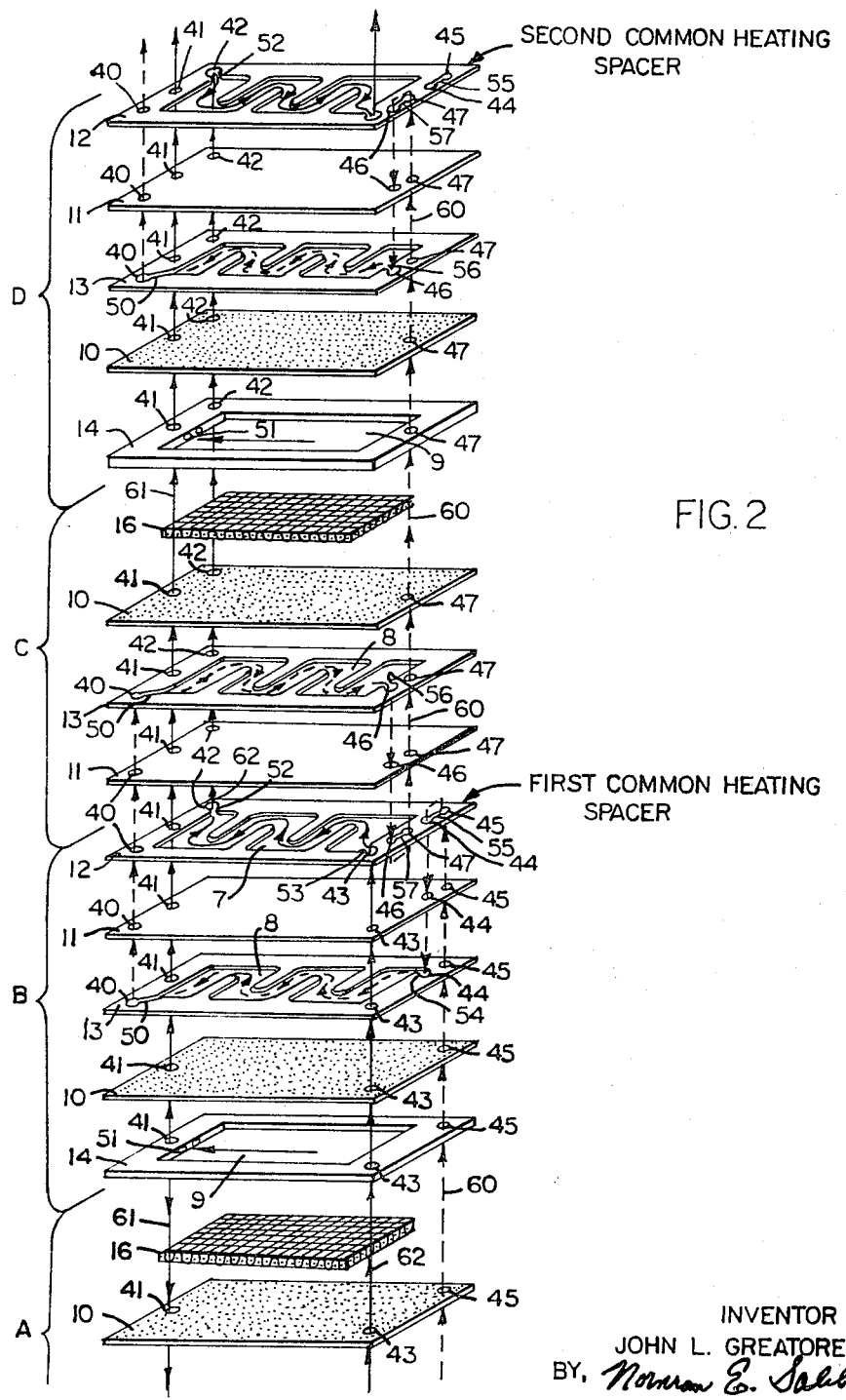
FIG. 2 is a fragmentary section of the apparatus showing an alternate arrangement without the separator plate wherein a heating spacer having a pair of stream deflecting means is placed common between each repeating unit pair.

FIG. 2 illustrates a portion of the apparatus wherein the separator plate 15 of FIG. 1 is eliminated and a heating compartment spacer is common between two subassemblies. As shown, a first common heating spacer 12 is placed between subassembly B and subassembly C. This common heating spacer is defined on both sides by heat exchange sheets 11 which serve simultaneously to heat the fluid mixtures flowing through the adjacent feed spacers 13 of both subassemblies B and C and conveniently eliminates one heating spacer. This first common heating spacer has a pair of fluid deflecting means. The first deflecting means comprising apertures 44 and 45 with connecting passageway 55 is employed to deflect the feed stream 60 from subassembly A back to the feed spacer 13 of subassembly B. The second deflecting means comprised of apertures 46 and 47 with connecting passageway 57 is employed to deflect the effluent feed stream 60 from the feed compartment 8 of subassembly C back in the direction towards subassembly D via conduit apertures 47. The stream continues to flow through apertures 47 to the second common heating spacer 12 located between subassembly D and the next adjacent subassembly E (not shown). The second common heating spacer is constructed with a pair of deflecting means similar to the first common heating spacer. One of said deflecting means of said second heating spacer will likewise be used to direct the feed stream through conduit apertures 46 back to the feed compartment 8 of subassembly D as the influent stream to that compartment.

The number of subassemblies employed between the end plates of a stack and the membrane area available for transport can of course vary depending on the volume of feed required to be processed. A plurality of consecutively arranged permeation stacks may be used to effect a high degree of concentration or separation, in which case the effluent mixture from one stack serves as the influent feed mixture to the next stack, and so on. The permeation apparatus may be employed in a continuous operation or may be applicable to batch type systems.

The description of the invention and the drawings have been made with specific reference to a membrane permeation (pervaporation) apparatus and process; however, the invention is not to be construed as limited thereto except as defined in the appended claims and is, in particular, useful also in mass diffusion, gaseous diffusion (molecular effusion) dialysis, electro-dialysis, piezodialysis, thermodialysis, osmosis, electroösmosis, piezoösmosis (reversed osmosis) thermoösmosis, ultrafiltration (hyperfiltration), electrodecantation and other barrier separation processes.

What is claimed is:

1. An apparatus for removing one or more components from a fluid mixture, comprising juxtaposed first and second subassemblies forming a pair of such subassemblies disposed in a stack array between terminal plates, each subassembly comprising in combination as essential elements spacer-frame members and barriers defining at least a first compartment and a second compartment, said second compartment having on at least one side a semipermeable membrane barrier, said membrane having associated therewith on at least one side permeable support means in face-to-face contact with the membrane barrier, said spacer-frames and barriers having a plurality of spaced, registering apertures interconnected to form at least two fluid flow conduit means through such subassemblies in a composite direction generally and approximately perpendicular to the plane of the elements forming said subassembly, at least some of said apertures in said spacer-frames having channels associated therewith extending into said defined compartments, means for maintaining a difference in fluid pressure between the faces of said membrane barrier to force said membrane barrier against said support means, first conduit means for removing a first fluid stream from said first compartment, second conduit means for removing a second fluid stream from said second fluid compartment, at least said second conduit means containing stream deflecting means associated with the spacer-frame of said first compartment, said stream deflecting means being arranged to change the direction of flow of said stream by approximately 180 degrees.

2. An apparatus for removing one or more components from a fluid mixture, comprising at least one subassembly disposed between a pair of terminal plates, the elements of said subassembly comprising in combination spacer-frame members defining respectively at least a first compartment, a second compartment and a third compartment, said second compartment having on one side a barrier separating it from said first compartment and a semi-permeable membrane barrier on the other side, said membrane barrier having associated therewith porous support means in face-to-face contact with the surface of said membrane barrier facing away from said second compartment, at least some of said elements having apertures through their gasket area, said apertures being aligned to form fluid flow conduits through the subassembly substantially at right angles to the plane of said elements, some of said apertures in said spacers having channels associated therewith extending into said respectively defined compartments, a first conduit means for maintaining a lower pressure in said third compartment than in said adjacent second compartment, a second conduit means for introducing and removing a heating fluid from said first compartment and a third conduit means for introducing and removing a fluid mixture from said second compartment.

3. An apparatus for removing one or more components from a fluid mixture, comprising first and second subassemblies forming a pair of such subassemblies disposed in a stack arrangement between terminal end plates, each subassembly comprising in combination spacer-frame members defining respectively a first compartment, a second compartment and a third compartment, said second compartment having on one side a barrier separating it from the said first compartment and a semi-permeable membrane barrier on the other side separating it from said third compartment, said third compartment being common to said first and second subassemblies and defined on both sides by a semi-permeable membrane barrier, said third compartment having associated therewith porous support means in face-to-face contact with that side of each of said adjacently placed membranes which faces said third compartment, said spacers and barrier having a plurality of apertures through their gasket areas being aligned to form fluid flow conduits through such subassemblies at right angles to the elements forming said subassembly, some of said apertures in said spacers having channel associated therewith extending into said respectively defined compartments, a first conduit means for maintaining a lower pressure in said third compartment than in said adjacent second compartment, a second conduit means for introducing and removing a fluid stream from said first compartment and a third conduit means for introducing and removing a fluid mixture from said second compartment, said third conduit means further containing deflecting stream means associated with said first compartment spacer.

4. The apparatus of claim 3 wherein said third conduit means comprises a conduit for flowing said fluid mixture in a first direction past said first compartment to said second compartment in said first subassembly, inlet and outlet means for passing said stream to and from said second compartment in said first subassembly, a conduit for further passing said stream in a second direction to said deflecting means in said first compartment spacer in said first subassembly, said deflecting means completely reversing said flow stream back in said first direction past said second compartment in said first subassembly and past said second compartment in said second subassembly to deflecting means in said first compartment of said second subassembly, said deflecting means completely reversing said flow stream back in said second direction to said second compartment in said second assembly, inlet and outlet means for passing said stream to and from said second compartment in said second subassembly and a conduit for withdrawing said stream from said pair of subassemblies.

5. The apparatus of claim 3 wherein the support means is located within said third compartment and wherein said lower pressure in said third compartment is connected to means for providing at least a partial vacuum therein.

6. The apparatus of claim 3 wherein a plurality of repeating pairs of subassemblies is disposed between terminal end plates.

7. The apparatus of claim 6 wherein each pair of subassemblies is separated from the next adjacent pair of subassemblies by an impervious plate.

8. The apparatus of claim 6 wherein said first compartment spacer defined on both its sides by a barrier sheet is made common to each repeating adjacent unit pair.

9. The apparatus of claim 8 wherein said common first compartment spacer contains at least two deflecting means.

10. A process for removing a component from a fluid mixture which process comprises introducing a fluid mixture stream to the second compartments of a multi-unit separation apparatus, said apparatus having at least a first and a second subassembly forming a juxtaposed pair of such assemblies disposed in a stack arrangement between terminal end plates, each subassembly comprising in combination spacer-frame members defining respectively a first compartment, a second compartment and a third compartment, said second compartment having on its one side a barrier sheet separating it from the said first compartment and a semi-permeable membrane barrier on the other side separating it from said third compartment, simultaneously introducing a fluid into said first compartment and said fluid mixture stream into said adjacent compartments, to cause a component of the mixture in said second compartment to permeate said semi-permeable membrane barrier and continuously withdrawing said permeated component from said third component.

11. The process of claim 10 where the fluid mixture stream is passed in series through each second compartment by flowing said fluid mixture stream in a first direction past said first compartment in said first subassembly to said second compartment in said first subassembly, passing said stream into and out of said second compartment in said first assembly, further passing said stream in a second direction to the deflecting means in said first compartment spacer in said first subassembly, reversing said flow stream back in said first direction past said second compartment in said first subassembly and said second compartment in said second subassembly to deflecting means of said first compartment spacer in said second subassembly, completely reversing said stream back in said second direction to said first compartment spacer in said second subassembly, passing said stream into and out of said second compartment in said second subassembly and withdrawing said stream from said pair of subassemblies.

12. The process of claim 10 wherein a lower pressure is obtained in said third compartment by maintaining a partial vacuum therein.

13. The process of claim 10 wherein the fluid mixture is an aqueous coffee extract and the semi-permeable membrane is hydrophilic.

References Cited

UNITED STATES PATENTS 2,386,826   10/1945   Wallach et al. _____ 210—500 X

REUBEN FRIEDMAN, *Primary Examiner.*

F. SPEAR, *Assistant Examiner.*

UNITED STATES PATENT OFFICE
CERTIFICATE OF CORRECTION

Patent No. 3,398,091                         August 20, 1968

John L. Greatorex

It is certified that error appears in the above identified patent and that said Letters Patent are hereby corrected as shown below:

Column 10, line 51, "first" should read -- second --.

Signed and sealed this 5th day of May 1970.

(SEAL)
Attest:

Edward M. Fletcher, Jr.                  WILLIAM E. SCHUYLER, JR.
Attesting Officer                            Commissioner of Patents